(12) United States Patent
Mody

(10) Patent No.: US 12,609,891 B2
(45) Date of Patent: Apr. 21, 2026

(54) AUTOMATIC NETWORK ERROR ROUTING FOR DOWNSTREAM NETWORK HOP ERRORS

(71) Applicant: Fortinet, Inc., Sunnyvale, CA (US)

(72) Inventor: Krishna Nitin Mody, Concord, NH (US)

(73) Assignee: Fortinet, Inc., Sunnyvale, CA (US)

( * ) Notice: Subject to any disclaimer, the term of this patent is extended or adjusted under 35 U.S.C. 154(b) by 161 days.

(21) Appl. No.: 18/604,805

(22) Filed: Mar. 14, 2024

(65) Prior Publication Data

US 2025/0293972 A1 Sep. 18, 2025

(51) Int. Cl.
*H04L 45/28* (2022.01)
*H04L 45/00* (2022.01)
*H04L 45/021* (2022.01)

(52) U.S. Cl.
CPC ............ *H04L 45/28* (2013.01); *H04L 45/021* (2013.01); *H04L 45/22* (2013.01)

(58) Field of Classification Search
None
See application file for complete search history.

(56) References Cited

U.S. PATENT DOCUMENTS

| | | | | |
|---|---|---|---|---|
| 7,453,884 B2 * | 11/2008 | Ma | ......................... | H04L 47/125 |
| | | | | 370/395.32 |
| 7,584,298 B2 * | 9/2009 | Klinker | ................... | H04L 45/24 |
| | | | | 709/239 |
| 8,189,577 B2 * | 5/2012 | Vaswani | ............. | H04L 41/0856 |
| | | | | 370/389 |
| 8,588,238 B2 * | 11/2013 | Weill | ..................... | H04L 45/38 |
| | | | | 370/392 |
| 11,502,940 B2 * | 11/2022 | Retana | .................. | H04L 45/021 |
| 12,407,604 B2 * | 9/2025 | Venkatesh | ............... | H04L 45/28 |
| 2003/0202473 A1 * | 10/2003 | Patrick | .................... | H04L 45/20 |
| | | | | 370/235 |
| 2013/0332602 A1 * | 12/2013 | Nakil | ..................... | G06N 20/00 |
| | | | | 709/224 |
| 2023/0261977 A1 * | 8/2023 | Fan | ........................ | H04L 45/28 |
| | | | | 370/235 |
| 2023/0388894 A1 * | 11/2023 | Chen | ....................... | H04L 45/24 |
| 2025/0150383 A1 * | 5/2025 | Rajagopalan | ........... | H04L 45/22 |

* cited by examiner

*Primary Examiner* — Jeffrey R Swearingen

(74) *Attorney, Agent, or Firm* — Law Office of Dorian Cartwright; Dorian Cartwright

(57) ABSTRACT

A routing table of a network routing device is dynamically updated responsive to detecting a downstream error in a switch. The error can be identified by inspecting payloads appended to data packets received from downstream devices, to detect a deviation from the routing table. As a result, subsequent downstream packets use the alternative path to bypass the downstream error, until resolved.

20 Claims, 6 Drawing Sheets

100

100

Figure 3:
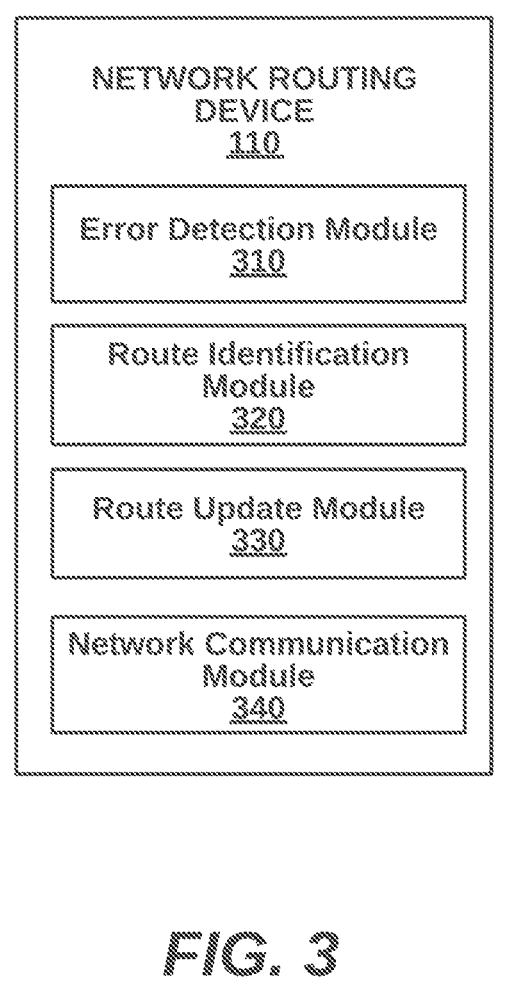

NETWORK ROUTING
DEVICE
110

Error Detection Module
310

Route Identification
Module
320

Route Update Module
330

Network Communication
Module
340

AUTOMATIC NETWORK ERROR ROUTING FOR DOWNSTREAM NETWORK HOP ERRORS

FIELD OF THE INVENTION

The invention relates generally to computer networks, and more specifically, for automatically updating network routing tables responsive to downstream network hop errors.

BACKGROUND

Computer networks are composed of numerous routing and switching devices, that are interconnected from one end to another, to pass data packets from a user device on one end to a user device on another end. Between these ends, the data packets are passed over network hops from one device to another, using a destination address and routing tables as a guide.

However, network devices can experience downtime due to various reasons, such as human error, routing loops, power outages, network congestion, and offline software updates. These dynamic conditions can be temporary or permanent. Because there are so many network hops, a routing device is often unaware of errors along a prescribed route, causing data packets to be transmitted over routes that are no longer or temporarily invalid. This can cause lost packets and delays on networks.

What is needed is a robust technique for automatically updating network routing tables responsive to downstream network hop errors caused by network device.

SUMMARY

To meet the above-described needs, methods, computer program products, and systems for automatically updating network routes responsive to downstream network hop errors.

In one embodiment, a routing error is detected with respect to a routing path of a network routing device, caused by an error in a switch or other device along the routing path. The routing error can be deciphered from a data packet sent upstream from the source to the destination, and received by a routing device, by inspecting a payload of the data packet. Each hop of an actual path is recorded by appending a switch identification within the data packet payload, which may deviate from a path in a routing table. From the series of network hops in the payload, a new link is identified from the plurality of links between the routing device utilizing a second switch, that provides an alternative, valid routing path between the routing device and the source.

In another embodiment, a routing table of the routing device is automatically updated to include the alternative routing path for overcoming the routing error.

In still another embodiment, a downstream data packet sent downstream is transmitted from the destination to the source over the alternative routing path of the routing table. Additionally, a downstream data packet addressed to a second source, can be sent over the alternative routing path prior to receiving a data packet sent upstream from the second source over the alternative routing path.

Advantageously, computer networks are improved with better network security.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 3 is a more detailed block diagram illustrating a network security device of the system of FIG. 1, according to one embodiment.

DETAILED DESCRIPTION

Methods, computer program products, and systems for automatically updating network routes responsive to downstream network hop errors. Generally, a network hop error from a network device on a planned routing path causes data packets to be sent over an alternative routing path. The following disclosure is limited only for the purpose of conciseness, as one of ordinary skill in the art will recognize additional embodiments given the ones described herein.

I. Systems for Automatic Network Error Routing (FIGS. 1-3)

Figure 1:
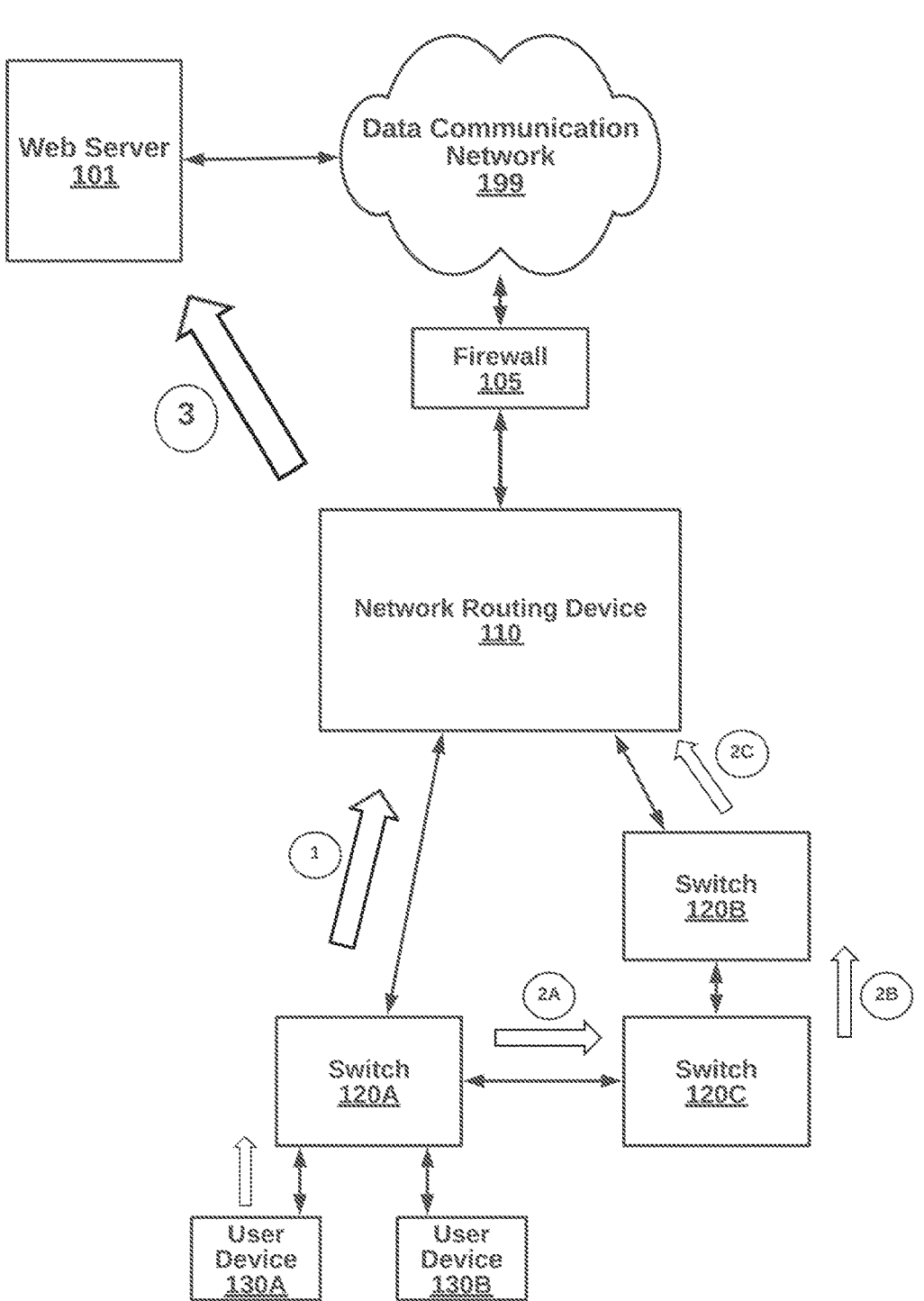
FIG. 1 is a high-level block diagram illustrating upstream initial and alternative paths in a system coordinating for automatically updating network routes responsive to downstream network hop errors, according to some embodiments.
Figure 2:
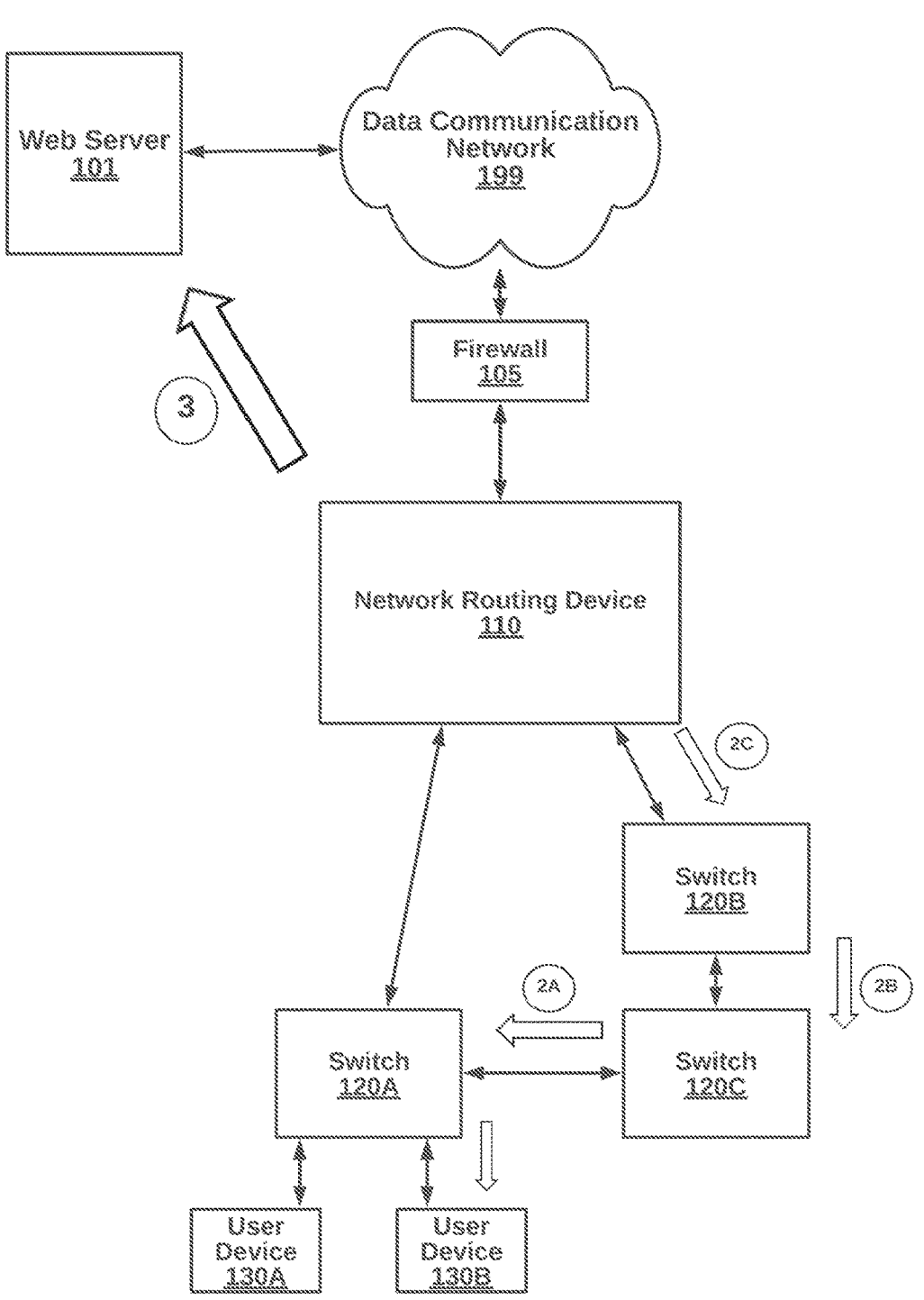
FIG. 2 is a high-level block diagram illustrating a downstream alternative path in the system coordinating for automatically updating network routes responsive to downstream network hop errors, according to one embodiment.
Figure 6:
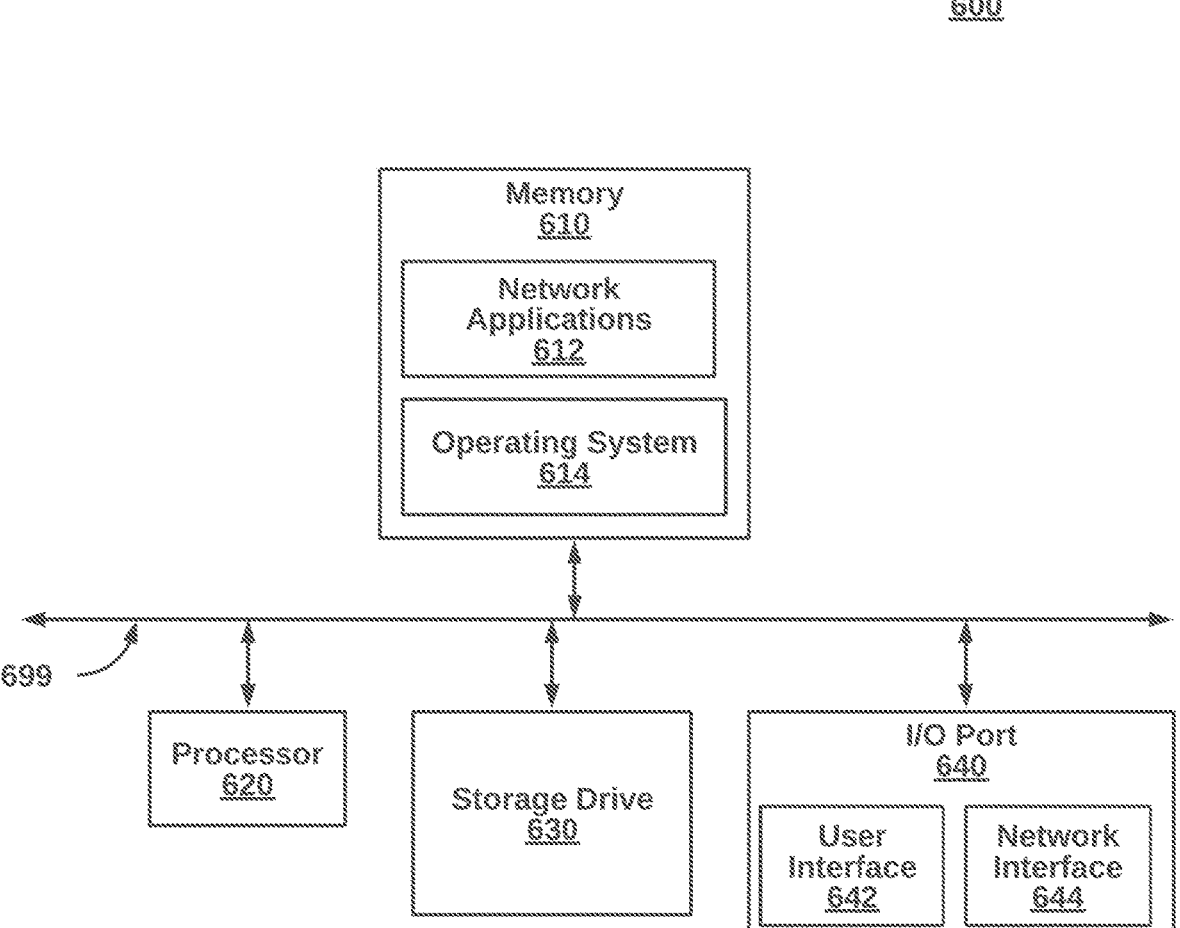
FIG. 6 is a block diagram illustrating an example computing device for the system of FIG. 1, according to one embodiment.

FIG. 1 a high-level block diagrams illustrating a system 100 for automatically updating network routing tables responsive to downstream network hop errors, according to an embodiment. The system 100 includes a network routing device 110, switches 120A-C and user devices 130A,B on an enterprise network behind a firewall 105. In turn, the firewall 105 and a web server 101 are coupled to the data communication network 199. Other embodiments of the system 100 can include additional components that are not shown in FIG. 1, such as network gateways, access points and wireless stations. Further, there can be more network routing devices, switches, user devices and additional external resources. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system 199 via hard wire (e.g., network routing device 110, switches 120A-C firewall 105 and user devices 130A,B). The components can also be connected via wireless networking (e.g., user devices 130A,B implemented as wireless stations). The data communication network 199 can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use, for example, IPv4 of IPv6 address spaces.

In one embodiment, the network routing device 110 updates routing paths to automatically avoid network errors over downstream network hops. The dynamic nature of errors can be met with temporary reroutes around optimal paths, in real-time. Once the error has been corrected, the original routing can be automatically restored to the routing table. In general, a routing table is a map expressed as a set of rules that can be in table format, and used to determine where data packets traveling over an IP network will be directed. The routing table can be stored in RAM memory for fast access.

In an implementation, the network routing device 110 parses and analyzes payloads or received data packets, consecutively or intermittently, to identify actual route paths. A deviation in actual route path from a planned route path stored in a routing table can be indicative of an error along the way. For instance, errors can be caused by a device that loses power, goes offline to update software, or is subject to a spike in network traffic. This dynamic condition can be met with an update to the routing table to insert actual paths being taken by data packets received at the network routing device 110 as a correction to planned paths. Besides rerouting around errors, in some implementations, the network routing device 110 may take an action in an attempt to remediate the error (e.g., notify an administrator or other network devices, send a flag, determine the type of error, or change a configuration). Additional embodiments of the network security device 110 are described below with respect to FIG. 2.

Switches 120A-C define upstream and downstream paths from user devices 130A,B between network routing device 110 and user devices 130A,B with network hops. Various paths 3 are accessed for exchanging data packets between the network routing device 110 and the web server 101 (or other external network resources). In more detail, FIG. 1 shows user device 130A transmitting data packets upstream over path 1 using switch 120A to reach web server 101 via network routing device 110. Responsive to an error, an alternative path 2A/2B/2C is utilized to reach web server 101 via the same network routing device 110. After analysis at the network routing device 110 identifies the reroute, downstream data packets are sent back down the alternative path 2C/2B/2A, as shown in FIG. 2. In one case, the downstream packets are reply data packets to user device 130A. In another case, downstream packets sent to user device 130B are preemptively rerouted, based on the error with respect to user device 130A.

Many other switch configurations can be implemented, resulting in many other initial path routes and reroutes. One of ordinary skill in the art will recognize these variations to be within the spirit of the present disclosure, even without being specifically disclosed. For example, there can be 10 or more switches with 15 or more different network hops, lending to multiple alternative paths due to errors. In some cases, received data packets take different alternate routes, and the network routing device 110 can keep a tally as votes for the best alternative route to use in updating its routing table.

FIG. 3 is a more detailed block diagram illustrating the network routing device 110 of the system of FIG. 1, according to one embodiment. The network routing device 110 includes an error detection module 310, a route identification module 320, a route update module 330 and a network communication module 340. The components can be implemented in hardware, software, or a combination of both.

The error detection module 310 can detect a routing error, in an initial routing path between a source and a destination over a first switch of a plurality of switch devices connected downstream from the routing device, from a data packet sent upstream from the source to the destination. In one case, the error is detected by inspecting a payload of the data packet received from the source over a second switch of the plurality of switches. A series of network hops over a plurality of links has been included in the payload. The second switch provides an alternative routing path between the routing device and the source.

The route identification module 320 can identify, from the series of network hops, a new link from the plurality of links between the routing device and the first switch utilizing the second switch, that provides an alternative routing path between the routing device and sources.

The route update module 330 automatically updates a routing table of the network routing device to include the alternative routing path for overcoming the routing error. There can be one or more alternative paths. In one embodiment, a timeout is set for the update to expire and return to a previous path. As a result, data packets of a second user device can be preemptively rerouted around downstream errors based off information gleaned from actual paths for data packets of a first user device.

The network communication module 340 transmits a downstream data packet sent downstream from the destination to the source over the alternative routing path of the routing table. Additionally, in one implementation, the network communication module 240 transmits, over the alternative routing path, a downstream data packet addressed to a second source, prior to receiving a data packet sent upstream from the second source over the alternative routing path. More generally, the network communication module 240 handles protocols and APIs necessary for communication over a physical channel.

II. Methods for Automatic Network Error Routing (FIGS. 4-5)

Figure 4:
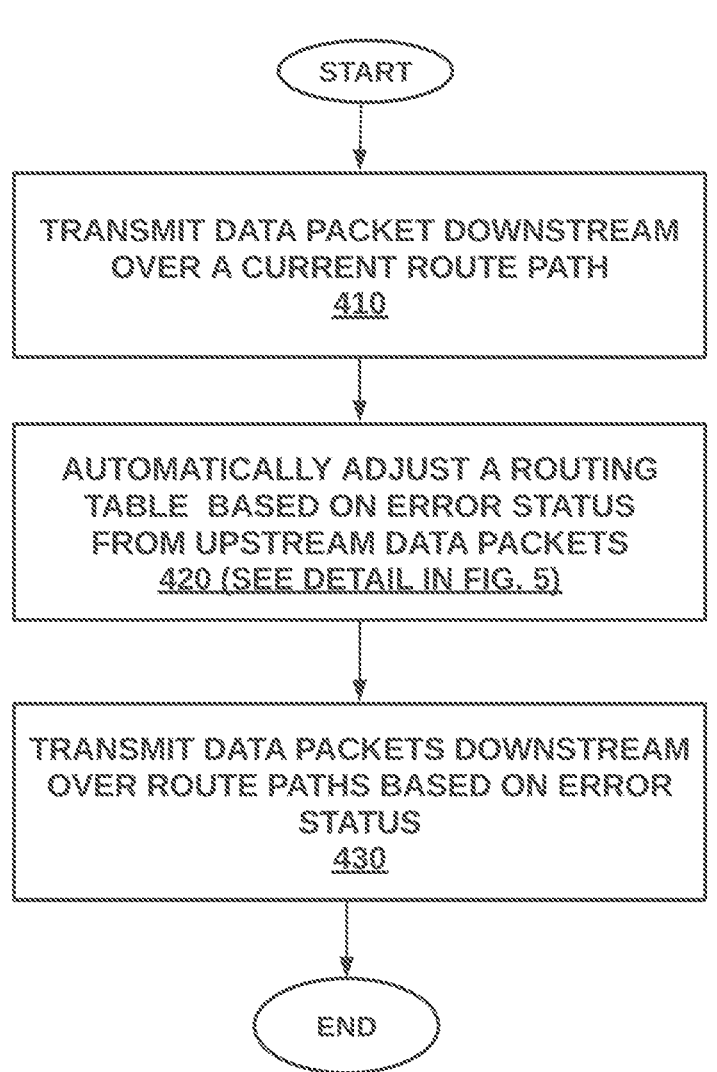
FIG. 4 is a high-level flow diagram illustrating a method for automatically updating network routes responsive to downstream network hop errors, according to an embodiment.

FIG. 4 is a high-level flow diagram of a method 400 for automatically updating network routes responsive to downstream network hop errors, according to an embodiment. The method 400 can be implemented by, for example, system 100 of FIG. 1. The specific grouping of functionalities and order of steps are a mere example as many other variations of method 400 are possible, within the spirit of the present disclosure. Other variations are possible for different implementations.

At step 410, data packets are transmitted downstream from a network routing device to a user device over a current path. At step 420, a routing table for the network routing device is automatically adjusted based on an error status deciphered from data packets received on an upstream path. Finally, at step 430, data packets are transmitted downstream over an alternative path while errors exist. In some cases, an initial path is restored once the error no longer exist.

Figure 5:
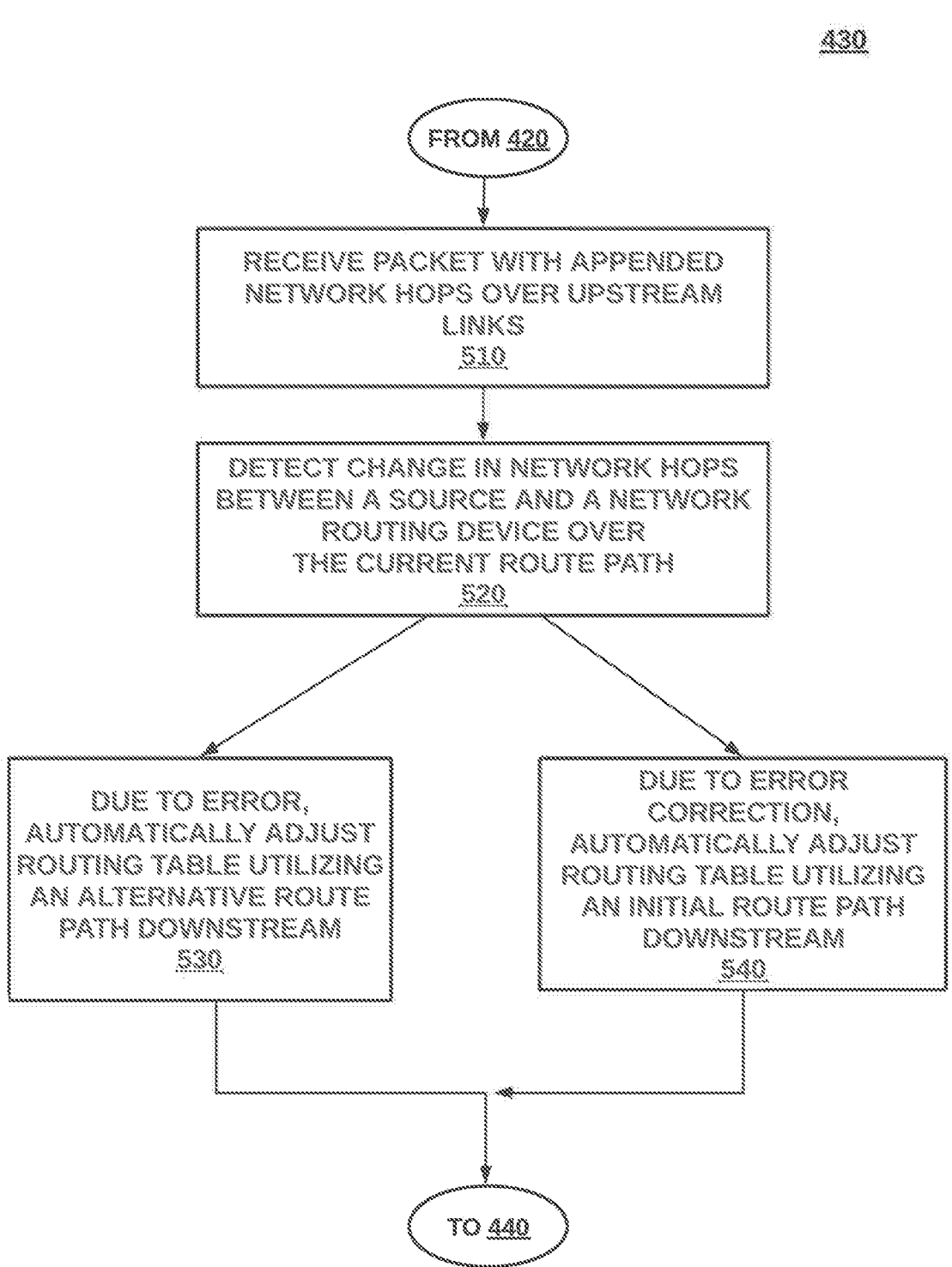
FIG. 5 is a flow diagram illustrating a method for scanning inactive dynamic pages for vulnerabilities, according to one embodiment.

FIG. 5 shows the step 420 of automatically adjusting the routing table. At step 510, a routing error is detected in an initial routing path between a source and a destination over a first switch of a plurality of switch devices connected downstream from the routing device, from a data packet sent upstream from the source to the destination. By inspecting a payload of the data packet received from the source over a second switch of the plurality of switches, which includes a series of network hops over a plurality of links has been included in the payload. The second switch provides an alternative routing path between the routing device and the source.

At step 520, from the series of network hops, a new link from the plurality of links between the routing device and the first switch utilizing the second switch, is identified, that provides an alternative routing path between the routing device and the second source. In response, at step 530, a routing table of the routing device is automatically updated to include the alternative routing path for overcoming the routing error.

At step 540, a downstream data packet is transmitted downstream from the destination to the source over the alternative routing path of the routing table. Similarly, a downstream data packet addressed to a second source is transmitted over the alternative path, prior to receiving a data packet sent upstream from the second source over the alternative routing path.

III. Computing Device for Automatic Network Error Routing (FIG. 6)

FIG. 6 is a block diagram illustrating a computing device 600 for use in the system 100 of FIG. 1, according to one embodiment. The computing device 600 is a non-limiting example device for implementing each of the components of the system 100, including network routing device 110, the switches 120A-C and the user devices 130A,B. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTI-GATE family of network security appliances and FORTI-CARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A computer-implemented method in a network routing device on a data communication network, for automatically updating network routes responsive to downstream network hop errors, the method comprising:

detecting a routing error, in an initial routing path between a source and a destination over a first switch of a plurality of switch devices connected downstream from the routing device, from a data packet sent upstream from the source to the destination, by inspecting a payload of the data packet received from the source over a second switch of the plurality of switches, wherein a series of network hops over a plurality of links has been included in the payload, and wherein the second switch provides an alternative routing path between the routing device and the source;

identifying, from the series of network hops, a new link from the plurality of links between the routing device and the first switch utilizing the second switch, that provides an alternative routing path between the routing device and a second source;

automatically updating a routing table of the routing device to include the alternative routing path for overcoming the routing error;

transmitting a downstream data packet sent downstream from the destination to the source over the alternative routing path of the routing table; and transmitting, over the alternative routing path, a downstream data packet addressed to the second source, prior to receiving a data packet sent upstream from the second source over the alternative routing path.

2. The method of claim 1, wherein the routing error comprises a routing loop detected by identifying a source being the same as a destination in the initial routing path.

3. The method of claim 1, wherein the routing error comprises a routing loop detected by identifying a destination that is part of the initial routing path.

4. The method of claim 1, further comprising receiving current network statistics and identifying routing congestion exceeding a threshold, wherein the routing error comprises the routing congestion within the initial routing path.

5. The method of claim 1, further comprising a third switch connected downstream from the second switch, wherein the new link is between the first switch and the third switch.

6. The method of claim 1, further comprising a subsequent detection of correction of the detected routing error by detecting an upstream data packet sent from the first switch over the initial routing path, and in response, subsequently automatically updating the routing table back to the initial routing path from the alternative routing path.

7. The method of claim 1, further comprising automatically updating the alternative routing path in the routing table of the routing device with a second alternative routing path.

8. The method of claim 1, wherein the data packet payload includes an identification of each switch over the initial routing path.

9. The method of claim 1, wherein the routing error is caused by one or more of a routing loop, a human error, a link failure and a power outage.

10. A non-transitory computer-readable medium in a network routing device on a data communication network, for automatically updating network routes responsive to downstream network hop errors, the method comprising:

detecting a routing error, in an initial routing path between a source and a destination over a first switch of a plurality of switch devices connected downstream from the routing device, from a data packet sent upstream from the source to the destination, by inspecting a payload of the data packet received from the source over a second switch of the plurality of switches, wherein a series of network hops over a plurality of links has been included in the payload, and wherein the second switch provides an alternative routing path between the routing device and the source;

identifying, from the series of network hops, a new link from the plurality of links between the routing device and the first switch utilizing the second switch, that provides an alternative routing path between the routing device and a second source;

automatically updating a routing table of the routing device to include the alternative routing path for overcoming the routing error;

transmitting a downstream data packet sent downstream from the destination to the source over the alternative routing path of the routing table; and transmitting, over the new routing path, a downstream data packet addressed to the second source, prior to receiving a data packet sent upstream from the second source over the alternative routing path.

11. A network routing device, for automatically updating network routes responsive to downstream network hop errors, the network routing device comprising:

a processor;

a network interface communicatively coupled to the processor and to a data communication network; and a memory, communicatively coupled to the processor and storing:

an error detection module to detect a routing error, in an initial routing path between a source and a destination over a first switch of a plurality of switch devices connected downstream from the routing device, from a data packet sent upstream from the source to the destination, by inspecting a payload of the data packet received from the source over a second switch of the plurality of switches, wherein a series of network hops over a plurality of links has been included in the payload, and wherein the second switch provides an alternative routing path between the routing device and the source;

a route identification module to identify, from the series of network hops, a new link from the plurality of links between the routing device and the first switch utilizing the second switch, that provides an alternative routing path between the routing device and a second source; and a route update module to automatically update a routing table of the routing device to include the alternative routing path for overcoming the routing error, wherein the network interface transmits a downstream data packet sent downstream from the destination to the source over the alternative routing path of the routing table, and wherein the network interface transmits, over the alternative routing path, a downstream data packet addressed to the second source, prior to receiving a data packet sent upstream from the second source over the alternative routing path.

12. The method of claim 10, wherein the routing error comprises a routing loop detected by identifying a source being the same as a destination in the initial routing path.

13. The method of claim 10, wherein the routing error comprises a routing loop detected by identifying a destination that is part of the initial routing path.

14. The method of claim 10, further comprising receiving current network statistics and identifying routing congestion exceeding a threshold, wherein the routing error comprises the routing congestion within the initial routing path.

15. The method of claim 10, further comprising a third switch connected downstream from the second switch, wherein the new link is between the first switch and the third switch.

16. The method of claim 10, further comprising a subsequent detection of correction of the detected routing error by detecting an upstream data packet sent from the first switch over the initial routing path, and in response, subsequently automatically updating the routing table back to the initial routing path from the alternative routing path.

17. The method of claim 10, further comprising automatically updating the alternative routing path in the routing table of the routing device with a second alternative routing path.

18. The method of claim 10, wherein the data packet payload includes an identification of each switch over the initial routing path.

19. The method of claim 10, wherein the routing error is caused by one or more of a routing loop, a human error, a link failure and a power outage.

20. The network routing device of claim 11, wherein the routing error comprises a routing loop detected by identifying a source being the same as a destination in the initial routing path.

* * * * *